United States Patent [19]

Beaston

[11] Patent Number: 4,928,514
[45] Date of Patent: May 29, 1990

[54] CALIBRATION CONTAINER

[75] Inventor: Brook J. Beaston, Wichita, Kans.

[73] Assignee: Great Plains Industries, Inc., Wichita, Kans.

[21] Appl. No.: 379,585

[22] Filed: Jul. 12, 1989

Related U.S. Application Data

[63] Continuation-in-part of Ser. No. 96,846, Sep. 15, 1987, and a continuation of Ser. No. 170,152, Mar. 18, 1988, abandoned.

[51] Int. Cl.$^5$ ............................................. G01F 25/00
[52] U.S. Cl. ............................................. 73/3; 73/427
[58] Field of Search ............ 73/1 H, 1 R, 3, 426–428; 422/100, 102; 222/154–159

[56] References Cited

U.S. PATENT DOCUMENTS

| | | | |
|---|---|---|---|
| 258,845 | 5/1882 | Young | 73/426 |
| 684,850 | 10/1901 | Nafis | 73/1 H |
| 3,461,728 | 8/1969 | Paoli | 73/426 |
| 3,880,012 | 4/1975 | Shapcott | 73/426 |
| 3,905,768 | 9/1975 | Hach | 422/100 |
| 4,033,190 | 7/1977 | Hudspeth | 73/426 |

FOREIGN PATENT DOCUMENTS

| | | | |
|---|---|---|---|
| 0574592 | 6/1931 | Fed. Rep. of Germany | 73/426 |
| 2330499 | 1/1975 | Fed. Rep. of Germany | 73/1 H |
| 1359161 | 7/1974 | United Kingdom | 73/1 H |

OTHER PUBLICATIONS

Ellisco Company, "Test Measure" container, one page advertisement.

Primary Examiner—Robert R. Raevis
Attorney, Agent, or Firm—Bill D. McCarthy

[57] ABSTRACT

A calibration container for accurately measuring a desired quantity of a selected liquid, the calibration container comprising an open-top vessel made of a substantially transparent material and having a neck portion extending vertically from a body portion thereof. Scale support ribs extend along opposite sides of the neck portion to slidably support a graduated indicator scale which has a zero indicator mark, the indicator scale attachable to the neck portion in a permanent location determined after aligning the zero indicator with a liquid meniscus formed in the neck portion and viewable through the neck portion.

5 Claims, 2 Drawing Sheets

CALIBRATION CONTAINER

CROSS REFERENCE TO RELATED APPLICATIONS

The present application is a continuation-in-part to U.S. Design patent application No. 96,846 filed Sept. 15, 1987, now pending and a continuation to U.S. patent application No. 170,152 filed Mar. 18, 1988, now abandoned.

BACKGROUND OF THE INVENTION

1. Field of the Invention

The present invention relates generally to the field of liquid measuring devices, and more particularly but not by way of limitation, to an improved calibration container which is inexpensive to manufacture yet sufficiently rugged to retain its accuracy during field service.

2. Discussion of Prior Art

Virtually every commercial liquid, including petroleum products, herbicides, insecticides, paints and the like, is measured by volume, either by filling a container of known capacity, or by transfer through a flow meter. When a flow meter is used to measure the quantity of a single liquid of known and relatively constant physical characteristics, such as that of a gasoline pump at a retail service station, the flow meter can be calibrated with the expectation that the accuracy of the indicated volume transferred through the meter will not vary over a long period of time.

However, in many other applications, such as the dispensing and mixing of agricultural herbicides, insecticides and the like, the flow rate indicated by a flow meter can be adversely affected by many factors, including varying viscosities of metered liquids and the solids content of the liquid. Dispensing and mixing operations of such liquids frequently take place in an open field or other location removed from a laboratory or factory environment where calibrations are usually initially made. Thus, there is a need for an inexpensive, sturdy, corrosion resistant container of known volumetric capacity which is suitable for use in calibrating a flow meter under field conditions.

Volumetric measuring of liquids has been addressed by numerous inventors, such as the earthenware liquid measure taught by Young in U.S. Pat. No. 258,845, who provided a device for calibrating total volumetric capacity by the inclusion of a removable supplemental ceramic piece fastened near the inside bottom of a container. Shapcott, in U.S. Pat. No. 3,880,012, disclosed a graduated measuring flask having a single volume mark with a permanent dark area immediately below the volume mark to enable the meniscus to be viewed more clearly against a white background.

Hudspeth, in U.S. Pat. No. 4,033,190 provided a device for accurately measuring large volumes of liquids, the device having a predetermined overflow level together with an overflow saver vessel for catching and preserving any liquid above the desired amount. Further, the Hudspeth patent teaches the addition of a displacement structure which is used to permit accurate changes in the measured volumes within the primary vessel. The size and complexity of the Hudspeth device renders it unsuitable for utilization beyond a factory or chemical processing environment.

Other calibration devices of general interest include those found in Nafis U.S. Pat. No. 685,850; Paoli U.S. Pat. No. 3,461,728; and Hach U.S. Pat. No. 3,905,768. These patents show various volumetric measuring devices which can be used in a controlled environment.

Probably the most widely accepted solution adopted for field calibration of liquid flow meters which are used in service involving corrosive fluids is the provision of specially constructed containers dedicated to the measurement of a specific fluid. For example, commercially available containers are frequently used for field calibration of in-line flow meters. One such prior art measuring container which is presently available for such service is that manufactured by the Ellisco Company of Philadelphia, Pa. The Ellisco test container is made of a heavy duty terneplate steel and has a transparent viewing window in its neck portion for the observation of the liquid meniscus. A graduated plate is adjustably secured in juxtaposition to the viewing window. The Ellisco container is fabricated by precision metal forming and welding techniques which, while generally acceptable, is expensive and is susceptible to miscalibration if dented or otherwise misshaped during agricultural related usage. Further, the transparent viewing window can be broken or marred, negating the utility of the containing for calibrating purposes.

The cost of fabricating prior art calibration containers, such as the Ellisco container, would lead one to look to the possibility of molding such containers with synthetic polymeric materials. However, the accuracy required of the calibration containers has heretofore weighted material selection in favor of metallic materials even at substantial higher manufacturing and material costs.

None of the prior art containers known to the present inventor features portability, ease of manufacture and sufficient ruggedness to withstand the rigors of use at a field site, while also being relatively inexpensive to manufacture.

SUMMARY OF THE INVENTION

The present invention provides an inexpensive yet accurate calibration container for measuring a desired quantity of a selected liquid. The calibration container is an open-top vessel made of a substantially transparent polymeric material, the calibration container having a neck portion extending vertically from a larger diameter body portion. A scale support rib extends along the length of the neck portion, and a graduated indicator scale is supported by the scale support rib.

When filled with the desired liquid quantity a liquid meniscus is viewable through the neck portion, and the graduated indicator scale is disposed to align a zero indicator mark portion thereof with the liquid meniscus. The graduated indicator scale is then permanently heat staked to the neck portion, and the calibration container is emptied of the calibration liquid.

An object of the present invention is to provide an accurate and economical calibration container which is convenient to use and which is sufficiently rugged and durable to withstand the rigors of use in field conditions.

A further object of the present invention is to provide a factory calibration procedure in the manufacture of calibration containers that totally compensates for irregularities in volumetric capacity.

Other objects, features and advantages of the present invention will become clear from the following descrip-

DESCRIPTION

Like numerals and characters designate like elements throughout the figures of the drawings.

As will become clear with the following description, the present invention provides a calibration container constructed of a transparent or translucent polymeric material such as polyethylene, polyvinylchloride or the like with an open top. An upper portion or neck of the container has a diameter which is substantially smaller than that of the main body of the container so that when the container is filled at or near its designed capacity, a small change in the volume of liquid held therein results in a relatively large change in the level of the meniscus viewable through the neck.

Figure 1:
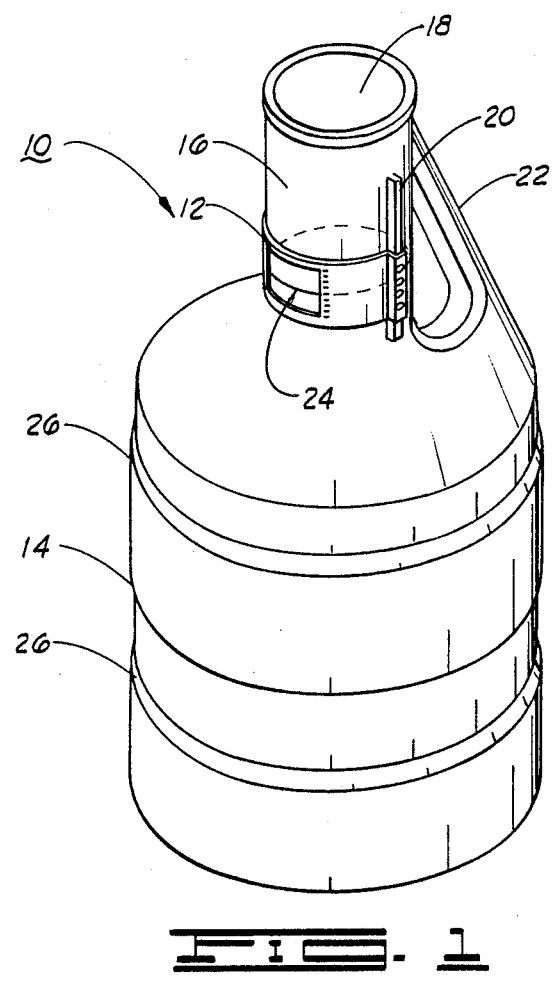
FIG. 1 is a perspective view of a calibration container constructed in accordance with the present invention. A meniscus is depicted as such would appear when the calibration container is filled with liquid.
Figure 2:
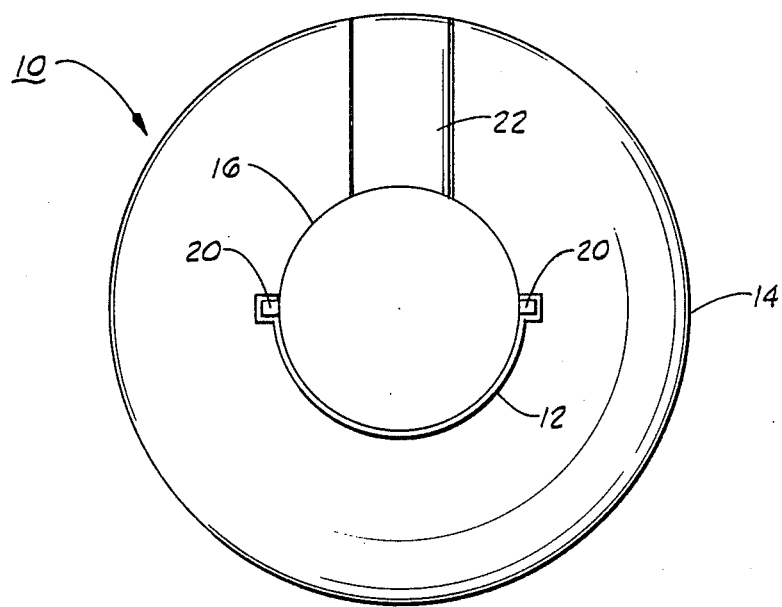
FIG. 2 is a top plan view of the calibration container of FIG. 1.
Figure 3:
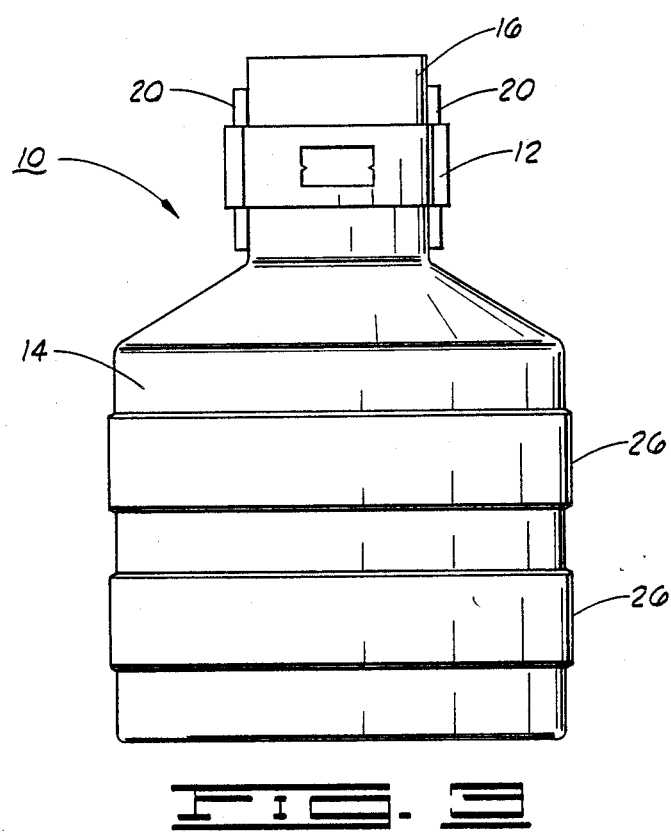
FIG. 3 is a front elevational view of the calibration container of FIG. 1.

Reference is now directed to FIG. 1, which shows a perspective view of a calibration container constructed in accordance with the present invention. More specifically:

10 depicts a calibration container, also sometimes herein referred to as a calibration vessel.

12 is a graduated indicator scale.

14 is a main body portion of the container 10.

16 depicts a neck portion of the calibration container 10, the neck 16 being substantially smaller in diameter than the diameter of the main body portion 14.

18 is a removable lid.

20 depicts two vertical scale support ribs extending along the neck portion 16.

22 depicts a handle which is molded to extend between the body portion 14 and the neck portion 16 at time of manufacture of the calibration container 10.

24 depicts the meniscus of a liquid which has substantially filled the calibration container 10, the meniscus 24 being shown as it appears when the calibration container 10 contains a precise amount of liquid it has been calibrated to measure.

26 are circumferential strengthening ribs in the body portion 14.

28 is a zero pointer of the graduated indicator scale 12.

In the preferred embodiment of the present invention, the calibration container 10 is constructed of a transparent or translucent plastic or polymeric material, such as polyethylene or polyvinylchloride, formed in the shape of an open top, cylindrical vessel, with the main body portion 14 having a substantially larger diameter than the neck portion 16. The handle 22 is molded for convenience in grasping, and the circumferential ribs 26 are formed in the body portion 14 to provide additional strength and rigidity to the calibration container 10. The two scale support ribs 20 protrude outward from each side of the neck portion 16 and are disposed 180 degrees from each other, extending substantially along the entire length of the neck portion 16.

Figure 4:
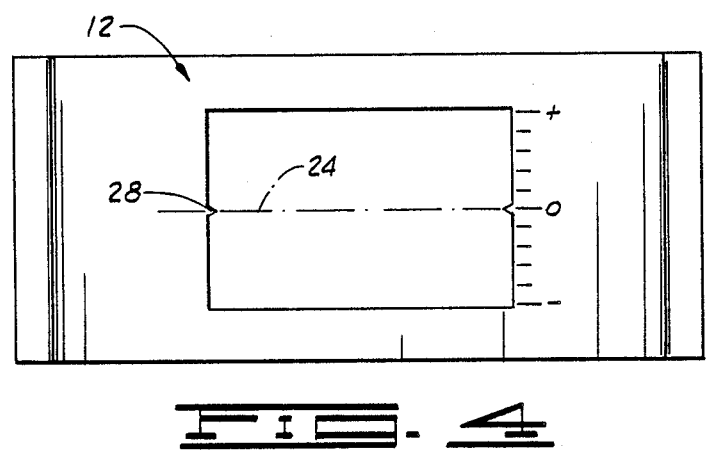
FIG. 4 is a front elevational view of an indicator scale.
Figure 5:
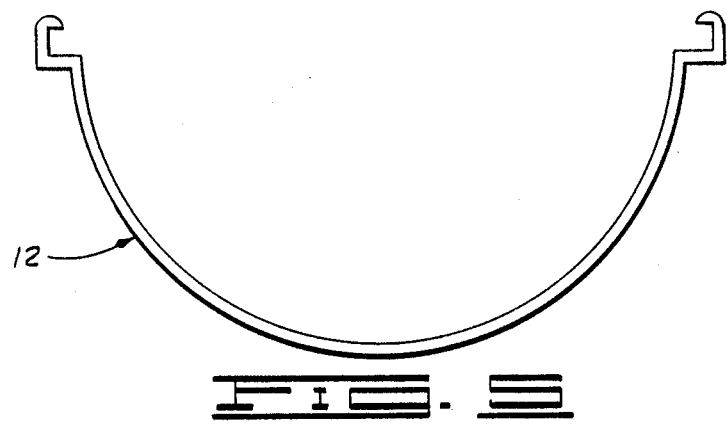
FIG. 5 is a plan view of the indicator scale of FIG. 4.

The graduated indicator scale 12, shown in detail in FIGS. 4 and 5, is also preferably constructed of a polymeric material, such as polyethylene or polyvinylchloride. To calibrate the calibration container 10, a quantity of a selected calibration liquid, the quantity of which is determined by weight, decantation from another container of known volumetric capacity or by some other convenient method, is poured into the calibration container 10. The relatively small diameter of the neck portion 16 causes a minor change in volumetric capacity of the calibration container 10 to be reflected in a substantial change in the level of the meniscus 24 as it appears through the neck portion 16. The graduated indicator scale 12 is slidably supported by the ribs 20 and moved vertically up or down so its zero pointer 28 is aligned to exactly align with the level of the meniscus 24. The indicator scale 12 is then permanently affixed to the scale support ribs 20 such as by heat welding or other suitable staking method. The calibration liquid can then be removed. The removable lid 18 prevents contamination of the interior of the container 10 when it is not in use.

The calibration container 10 can be formed, for example, by the process of blow molding, wherein a sheet of plastic material is softened by heat and then forced into conformation with a confining die by the application of compressed air. During the forming process, small irregularities within the container commonly occur which alter the volumetric capacity of the molded container. Compensation for these irregularities is accomplished at the time the indicator scale 12 is fastened to the container. The calibration container 10 is filled with a known volume of calibration liquid, and the transparency or translucence of the container material permits the level of the liquid meniscus to be observed through the container neck. The indicator scale 12, aligned to coincide precisely with the meniscus level 24, is permanently affixed to the container as described above. The handle 22, having appropriate dimensions to facilitate ease of handling and carrying, is molded into the body of the container 10.

As mentioned briefly hereinabove, the calibration container 10 of the present invention offers several advantages over prior art calibration containers. Metal containers for this purpose, although having excellent durability under many circumstances, are not as well suited for precision measurement verification in an adverse field environment for the reason that any denting or other shape impacting abuse is not remedial. The abuse afforded such containers at the hands of low or unskilled workers can be substantial, and an expensive stainless steel (or equivalent) vessel is not excepted. Also, the opacity of metal requires a sight window for meniscus viewing, and glass or other transparent sealants for a sight window is usually broken in time.

The polymeric construction of the calibration container 10 affords a substantially resilient vessel which can take a great deal of abuse while retaining its shape and thus its usefulness as a calibration container. Furthermore, the calibration container 10 can be manufactured and sold for a fraction of the cost of a comparable unit constructed of metal. In summary, the polymeric calibration container 10, with its transparent (or translucent) construction, offers a unitary vessel which is inexpensive to manufacture, is resistant to the chemicals placed in it and has a long useful life due to its resilient properties.

It is clear that the present invention is well adapted to carry out the objects and to attain the ends and advantages mentioned herein as well as those inherent in the invention. While the presently preferred embodiment of the invention has been described for purposes of this disclosure, numerous changes can be made which will readily suggest themselves to those skilled in the art and which are accomplished within the spirit of the invention disclosed and as defined by the appended claims.

What is claimed is:

1. A calibration container for measuring a precise quantity of liquid, the calibration container comprising:
    an open-top vessel constructed of a polymeric material and having a generally cylindrically shaped main body portion and a substantially transparent neck portion, the neck portion being substantially smaller in diameter than the main body portion, the neck portion extending substantially vertically from the main body portion and having at least one scale support rib extending along the length thereof; and
    scale means slidably supported on the neck portion of the vessel for indicating the meniscus level of a measured amount of a liquid, the scale means secured to the neck portion to establish such meniscus level, the scale means comprising a graduated indicator scale having a zero indicator pointer, the indicator slidably supported on the scale support rib and permanently attachable thereto when the zero indicator is aligned with the liquid meniscus.

2. The calibration container of claim 1 wherein the vessel has a handle member integrally formed with the body and neck portions and extending therebetween.

3. The calibration container of claim 2 wherein the neck portion of the vessel has two scale support ribs extending substantially the length of the neck portion and disposed on opposite sides of the neck portion.

4. The calibration container of claim 3 wherein the graduated indicator scale is permanently affixed to the neck of the vessel so that the zero pointer aligns with the meniscus appearing in the neck when the vessel is filled with precisely the desired amount of liquid, the indicator scale being provided with graduated markings to indicate the amount of variance from the desired quantity of liquid.

5. A method of providing and calibrating a calibration container for measuring a precise quantity of a selected liquid, comprising:
    forming a substantially transparent vessel having a body portion and a neck portion, the neck portion being smaller in diameter than the body portion and extending vertically therefrom, the neck portion having a pair of scale support ribs extending along the length thereof;
    forming an indicator scale having a zero pointer and shaped to be slidably supported on the scale support ribs;
    filling the vessel with a precise quantity of selected calibration liquid so that a meniscus level of the liquid appears within the neck portion;
    moving the indicator scale along the scale support ribs to align the zero pointer with the liquid meniscus as same is viewed through the neck portion;
    affixing the indicator scale to the neck portion so that the indicator scale is permanently secured at the position established by the preceding step; and
    removing the calibration liquid contained therein for achieving the above steps.

* * * * *